US011944256B2

(12) United States Patent
Naik

(10) Patent No.: US 11,944,256 B2
(45) Date of Patent: Apr. 2, 2024

(54) EASY LOADING SILVERWARE BASKET

(71) Applicant: WHIRLPOOL CORPORATION, Benton Harbor, MI (US)

(72) Inventor: Sujit S. Naik, Pune (IN)

(73) Assignee: WHIRLPOOL CORPORATION, Benton Harbor, MI (US)

( * ) Notice: Subject to any disclaimer, the term of this patent is extended or adjusted under 35 U.S.C. 154(b) by 303 days.

(21) Appl. No.: 17/198,866

(22) Filed: Mar. 11, 2021

(65) Prior Publication Data
US 2022/0287542 A1 Sep. 15, 2022

(51) Int. Cl.
A47L 15/22 (2006.01)
A47L 15/50 (2006.01)
F16H 25/12 (2006.01)
F16H 53/02 (2006.01)

(52) U.S. Cl.
CPC ............. *A47L 15/502* (2013.01); *A47L 15/22* (2013.01); *A47L 15/501* (2013.01); *A47L 15/504* (2013.01); *F16H 25/12* (2013.01); *F16H 53/02* (2013.01)

(58) Field of Classification Search
USPC .................... 134/56 D, 57 D, 58 D, 135, 164
See application file for complete search history.

(56) References Cited

U.S. PATENT DOCUMENTS

| 4,268,973 | A | 5/1981 | Jezuit et al. |
| 8,349,089 | B2 | 1/2013 | Bertsch et al. |
| 10,517,458 | B2 | 12/2019 | Wilson et al. |
| 10,531,781 | B2 | 1/2020 | Digman et al. |
| 10,750,924 | B2 | 8/2020 | Roderick et al. |
| 2005/0109378 | A1* | 5/2005 | Landsiedel ........... A47L 15/503 134/179 |

FOREIGN PATENT DOCUMENTS

| DE | 3625784 A1 | 2/1988 |
| DE | 102010018305 A1 | 10/2011 |
| EP | 3536216 A1 | 9/2019 |
| KR | 20080011995 A | 2/2008 |
| WO | 2017108096 A1 | 6/2017 |

* cited by examiner

Primary Examiner — Levon J Shahinian
(74) Attorney, Agent, or Firm — Brooks Kushman, P.C.

(57) ABSTRACT

A dishwasher system for cleaning dishes may include at least one rack configured to receive a silverware basket, the basket including at least one silverware compartment, a pair of camshafts including a first camshaft and a second camshaft, each fixed to the rack and operable by a gearbox configured to rotate the camshafts with respect to the rack, the camshafts arranged below the silverware basket, and a cam arranged at each end of each of the camshafts, wherein upon rotation of the camshaft by the gearbox, the cams affect the height of a respective corner of the basket to allow the silverware therein to be lifted or lowered and exposed to spray at various heights or angles from sprayers within the dishwasher.

19 Claims, 5 Drawing Sheets

EASY LOADING SILVERWARE BASKET

TECHNICAL FIELD

Disclosed herein are easy loading silverware baskets for dishwashers.

BACKGROUND

Dishwashers often include removable baskets for utensils and other item-specific storage. During a wash cycle, spray may hit utensils stored in the basket in order to clean the utensils. However, the utensils are generally stationary and spray patterns may not reach all surfaces of the utensils.

SUMMARY

A dishwasher system for cleaning dishes may include at least one rack configured to receive a silverware basket, the basket including at least one silverware compartment, a pair of camshafts including a first camshaft and a second camshaft, each fixed to the rack and operable by a gearbox configured to rotate the camshafts with respect to the rack, the camshafts arranged below the silverware basket, and a cam arranged at each end of each of the camshafts, wherein upon rotation of the camshaft by the gearbox, the cams affect the height of a respective corner of the basket to allow the silverware therein to be lifted or lowered and exposed to spray at various heights or angles from sprayers within the dishwasher.

A dishwasher system for cleaning dishes may include at least one rack configured to receive a silverware basket for receiving utensils for washing, a camshaft assembly fixed to the rack and operable by a gearbox, the camshaft assembly including at least one camshaft configured to rotate with respect to the rack via the gearbox, the camshaft arranged below the silverware basket, and at least one cam arranged on the camshaft, wherein upon rotation of the camshaft by the gearbox, the cam affects the height of the silverware basket to allow the utensils therein to be intermittently lifted and exposed to spray from sprayers within the dishwasher system.

A utensil tray for a dishwasher for housing utensils during washing may include a utensil basket including cavities to hold utensil, and a camshaft assembly arranged at a base of the basket and configured to interface with a gearbox, the camshaft assembly including at least one camshaft configured to rotate with respect to the basket via the gearbox, and at least one cam arranged on the camshaft, wherein upon rotation of the camshaft by the gearbox, the cam affects the height of the utensil basket to allow the utensils therein to be intermittently lifted and exposed to spray from sprayers within the dishwasher.

BRIEF DESCRIPTION OF THE DRAWINGS

The embodiments of the present disclosure are pointed out with particularity in the appended claims. However, other features of the various embodiments will become more apparent and will be best understood by referring to the following detailed description in conjunction with the accompanying drawings in which:

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Dishwashers often include baskets that are removable to load special items such as silverware, chopsticks, cooking utensils, etc. The items are cleaned by liquid spray generated by various sprayers within the dishwasher. However, oftentimes the items within the basket may become grouped together within the basket. Various basket designs attempt to mitigate this by including separate compartments for reviewing the utensils. In one example, a grid-like basket top may define various openings for silverware to be inserted one by one. However, this is time consuming, limits the number of utensils the basket can hold, and limits the flexibility of the basket to be used for different items that vary in size.

Disclosed herein is a utensil basket and assembly configured to selectively adjust the height of silverware in one area of the basket relative to silverware placed in another area of the basket to vary the surface at which the spray comes into contact with during a wash cycle. A camshaft mechanism may be arranged below the basket such that during a wash cycle, the camshaft mechanism may rotate to lift and then lower each of the corners of the basket at periodic intervals to push the silverware up and then down and into the spray pattern for better cleaning. Moreover, the motion may cause movement of the utensils within the basket to prevent them from becoming grouped together.

Figure 1:
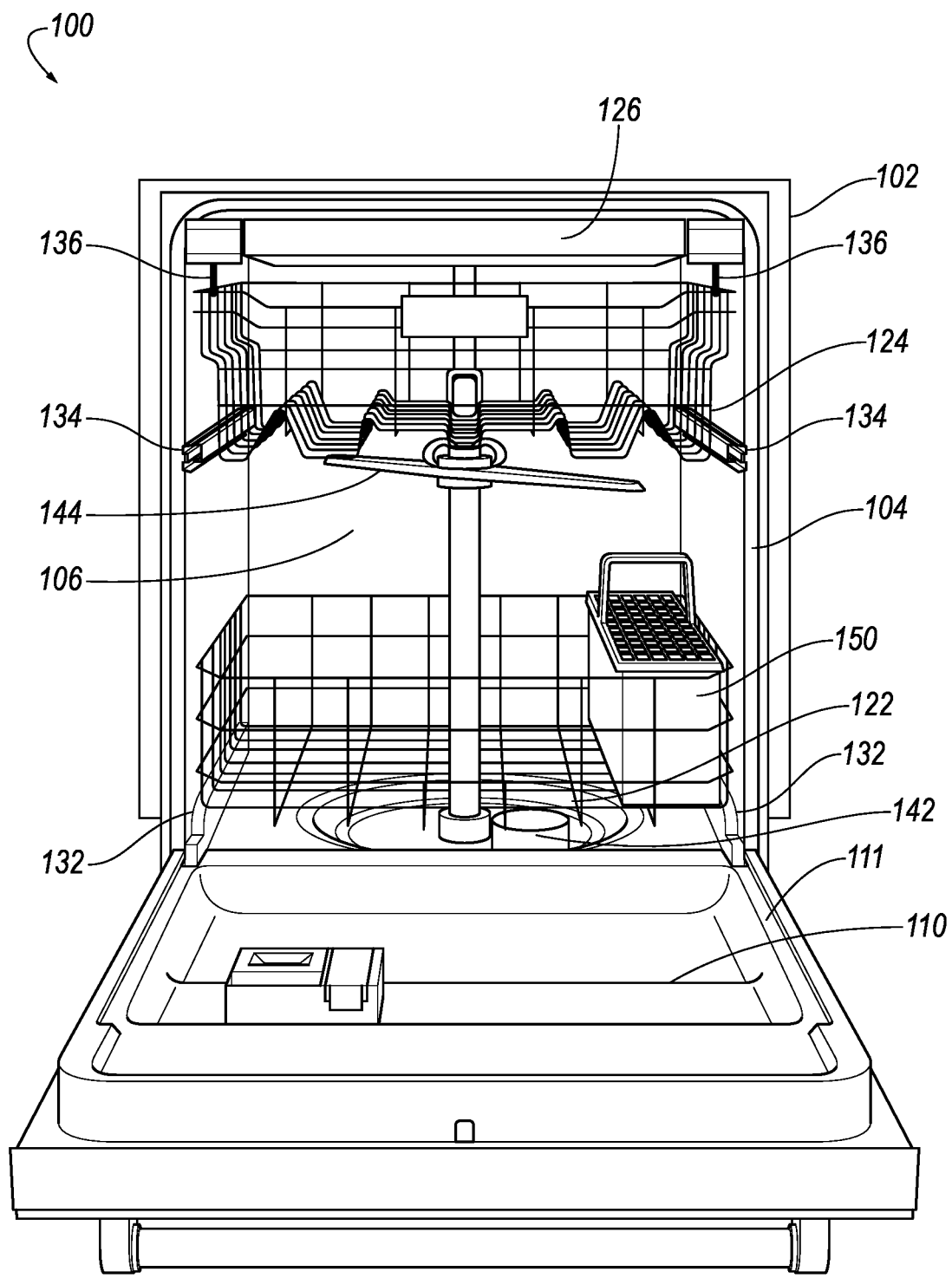
FIG. 1 illustrates an example front perspective view of a dishwasher in accordance with one example embodiment.

FIG. 1 illustrates an example front perspective view of a dishwasher 100 in accordance with one example embodiment. The dishwasher 100 may be an automated appliance configured to clean kitchen equipment placed within the dishwasher 100. The kitchen equipment may include tableware such as dishes, glassware, cutlery and other utensils, and well as food preparation equipment such as pots and pans, slicers, presses, and peelers. To perform the cleaning, the kitchen equipment is placed on racks 122, 124 inside a tub 104 of the dishwasher 100. A door assembly 110 is closed to form a watertight seal around the tub 104. Washing liquid and rinsing liquid is propelled from jets onto the kitchen equipment to clean dirt, grease, and other contaminants off the kitchen equipment. Though the examples described herein are generally related to in-home and personal use dishwashers, the same concepts may be applicable to commercial dishwashers as well.

The dishwasher 100 may include a frame 102 defining the exterior of the dishwasher 100. The frame 102 may be configured to interface with components exterior to the dishwasher 100 for installation, such as cabinets, countertops, floors, etc. The frame 102 may include a top, left side, right side, back, and bottom.

The tub 104 may define a hollow cavity or interior of the dishwasher for washing dishes. The tub 104 may define an open-face, or access opening 106 with walls at the top, left side, right side, back and bottom. A chassis (not individually labeled) may be arranged between the frame 102 and the tub 104 to maintain the tub 104 within the frame. The chassis may support the tub 104 and allow for maintaining space between the frame 102 and the tub 104.

A door assembly 110 may be arranged at a front of the dishwasher 100. The door assembly 110 may be attached to the dishwasher at the bottom front edge of the frame 102 and may be hinged thereat to move between open and closed positions. In the closed position, the door assembly 110 may seal the tub 104 at the access opening 106. In the open position, the cavity may be accessible via the access opening. In another example, the door assembly 110 may operate as a drawer that can be slidably extended outward from the front of the dishwasher 100 to move into the open position, and slidably retracted back into the dishwasher 100 to the closed position to seal the tub 104.

The tub 104 may house at least one dish rack. In the example shown in FIG. 1, the dishwasher 100 includes a first dish rack 122 and a second dish rack 124. It should be noted that while two disk racks are shown, this is only one example, and dishwashers 100 with more or fewer dish racks are possible. For instance, a dishwasher 100 may include a single rack or three or more racks.

Regardless of quantity or arrangement, the dish racks 122, 124 may be designed to hold the kitchen equipment in place for cleaning by the dishwasher 100. In many examples the dish racks 122, 124 are wire frame racks that allow for the flow of liquid within the tub 104. Although racks 122, 124 made of plastic, other materials are possible. The dish racks 122, 124 may generally include tines or other projections to allow the kitchen equipment to be washed to be held in a spaced apart relationship, such that the washing liquid and rinsing liquid can be projected onto the exposed kitchen equipment surfaces for cleaning these surfaces.

The racks are generally adapted to move between a retracted wash position within the tub 104 and an extended position outside the tub 104 for loading and unloading of the kitchen equipment to be washed. The racks typically include wheels or rollers for rolling movement along tracks or guides to the retracted and extended positions. In the illustrated example, the first rack 122 includes rollers or wheels that cooperate with first track rails 132 formed at the bottom wall of the tub 104. A door track 111 may be arranged on the dishwasher door assembly 110 as shown to allow the first rack to be rolled into an extended position when the door assembly 110 is open. The second rack 124 is generally mounted within the tub 104 along a pair of second support track rails 134 that cooperate with rollers associated with the side walls of the tub 104. Alternatively, the second rack 124 may be connected to a telescoping rail that allows the second rack to be extended out of the tub area when the door assembly 110 is open. Thus, as shown the first and second racks 122, 124 may be movable along their respective track rails 132, 134 to allow the respective racks 122, 124 to be slidable in and out of the access opening 106.

The dishwasher 100 may also include a spray system for spraying liquid within the tub 104 during a cleaning cycle. In an example cycle, washing liquid including soap may first be sprayed onto the kitchen equipment, and then once washed, rinsing liquid without soap may then be sprayed onto the kitchen equipment. The spray system may include various jets for providing the liquid onto the surfaces of dishes during the automated washing and rinsing operations. The spray system may include a bottom sprayer 142, middle sprayer 144, and a top sprayer (not shown). In some examples, one or more of the sprayers are positioned at fixed locations within the tub 104. In other examples, one or more of the sprayers may be rotating spray arms with various nozzles configured to spray water onto the dishes maintained on the rack for cleaning. For instance, water jets on the spray arm may be angled so the water sprays out of the spray arms at an angle (e.g., —45 degrees off the vertical) thereby causing the spray arms to rotate due to the pressure of the exiting water.

During loading, a user may open the door assembly 110 into the open position, pull the racks 122, 124 from the tub 104, and load the kitchen equipment onto the racks 122, 124. Once completed, the user may push the racks back into the tub 104, move the door assembly 110 back to the closed position, and initiate the cleaning cycle. Once the cleaning cycle has been completed, the user may again open the door assembly 110 to remove the cleaned kitchen equipment from the racks.

A third rack 126 may be arranged on and above one or more of the racks 122, 124. In the illustrated example, the third rack 126 is arranged above the second rack 124, but other configurations are possible, such as a single rack with a tray, or multiple racks each with a third rack 126, or one rack with multiple trays. As with the dish racks 122, 124, the third rack 126 is configured to receive kitchen equipment for washing. In one non-limiting example, the third rack 126 may be designed to hold kitchen equipment such as chopsticks or knives that, due to their dimensions, are more difficult to hold in a fixed spaced apart arrangement within the dish racks 122, 124 themselves.

Dishwashers often include removable storage or specific purpose storage to allow for better cleaning of certain utensils. In one example, a utensil basket 150 may be arranged in one of the racks 122, 124, 126. In the examples shown herein, the basket 150 is arranged in the first rack 122. The basket 150 may be fixed within the rack 122, and also may be selectively removable to allow for easier loading and unloading of items. Various tines or pins may be included on the rack 122 to maintain the basket 150 in a fixed position within the rack 122. The tines or pins of the rack 122 may be configured to receive the basket 150 at various locations, allowing for greater loading flexibility of the rack 122. During operation, the sprayers 142, 144 may spray liquid onto the basket 150 and its contents. This liquid may clean the utensils arranged within the basket 150.

Figure 2:
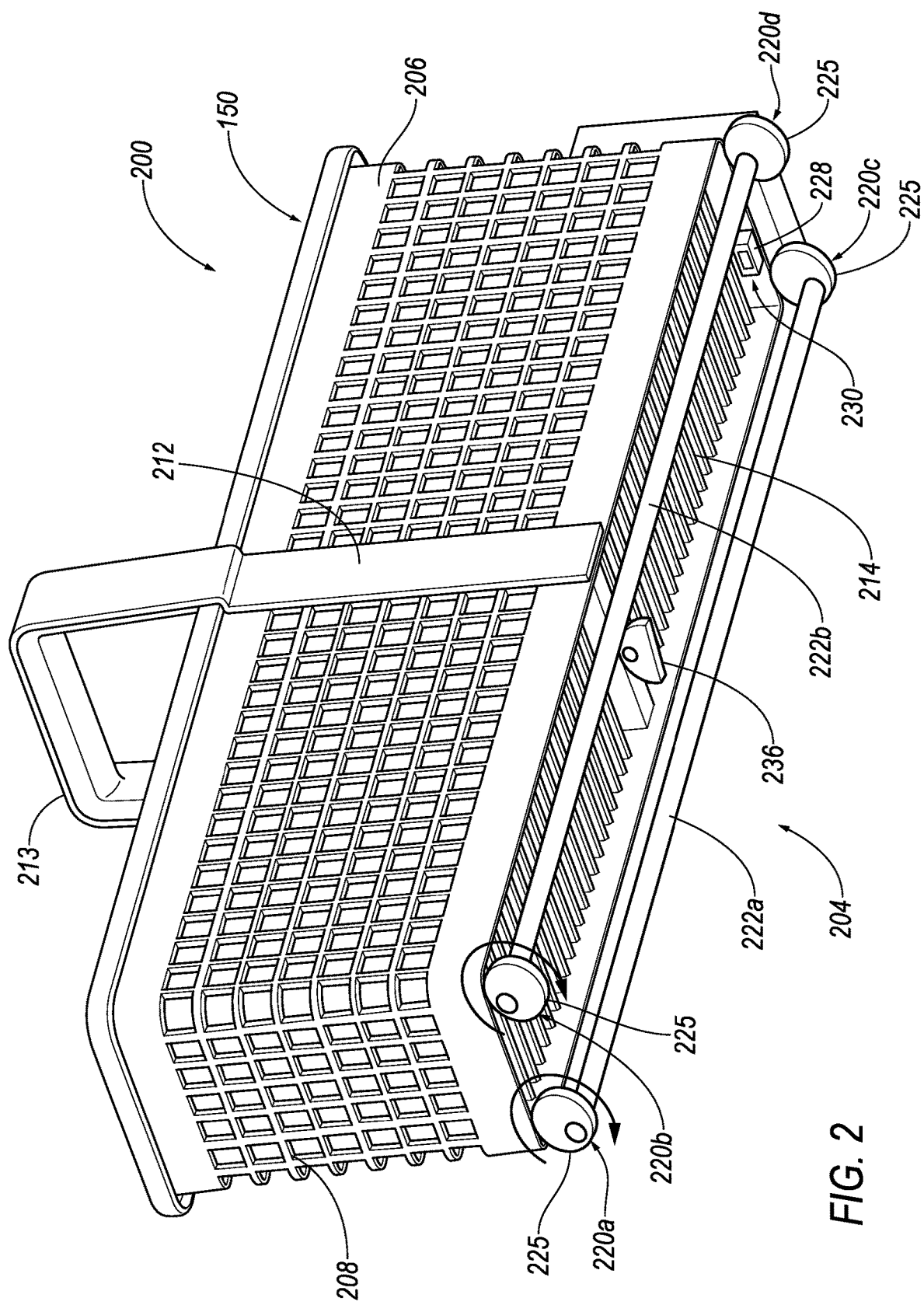
FIG. 2 illustrates a perspective view of an example silverware basket assembly.

FIG. 2 illustrates a perspective view of an example silverware basket assembly 200. The assembly 200 may include the basket 150 as illustrated in FIG. 1. The basket 150 may have a frame made up of four sides forming a rectangular shape where a first pair of sides 206 are connected by a second pair of sides 208, where the first pair of sides 206 are longer than the second pair of sides 208. A handle 213 may extend above a middle support 212 to allow for easy gripping by the user during removal and placement of the basket in the rack 112.

A plurality of partitions 210 (not individually labeled in FIG. 2, but illustrated in FIGS. 3 and 4) may extend between one pair of sides along the length of the basket 150. The partitions 210 may be spaced and parallel with each other and the second pair of sides 208. In the examples shown, the partitions 210 are equally spaced, but may be placed at varying distances so as to vary the length of the cavities that each partition 210 defines. The partitions 210 may facilitate holding utensils upright within the basket 150. The basket 150 may be closed via a basket base 214 at the bottom of the basket 150.

Each of the sides 206, 208, partitions 210, and base 214 may be formed by a plurality of interconnecting strips that define openings between the strips. The openings allow fluid to enter into the basket 150 and reach the utensils housed within the cavities. The example illustrated in the figures illustrates a grid-like structure, but other structures may be appreciated. In some example, one or more of the sides 206, 208, partitions 210, and bases 214 may also be solid. The basket 150 may be made of a plastic material, but other materials such as silicon, aluminum, etc., may also be used. The basket 150 may be coated or overmolded wire mess, stainless steel, etc.

The assembly 200 may also include a camshaft assembly 204 arranged below the basket 150. The camshaft assembly 204 may be arranged and fixed on the first rack 122 such that the camshaft assembly 204 is maintained on the rack 122 when the basket 150 is removed. The camshaft assembly 204 may include at least one camshaft 222 (also referred to herein a shaft 222) having at least one cam 220 arranged on the shaft 222. In the example herein, the camshaft assembly 204 includes a pair of shafts, a first shaft 222*a* and a second shaft 222*b*. The shafts 222 may maintain an equidistant space and run parallel to each other along the base 214 extending between the second sides 208. The shafts 222 may run parallel with the first sides 206.

Each shaft 222 may include at least one cam 220. In the example shown in FIG. 2, each shaft 222 includes a pair of cams 220 arranged at the ends of the shafts 222 such that a cam 220 is arranged at each corner of the base 214 of the basket 150. The first shaft 222*a* may include a first cam 220*a* and the second shaft 222*b* may include a second cam 220*b*. The first and second cams 220*a*, 220*b* may be arrange at a first of the second sides 208. The first shaft 222*a* includes a third cam 220*c* and the second shaft 222*b* may include a fourth cam 220*d*. The third and fourth cams 220*c*, 220*d* may be arrange at a second of the second sides 208 opposite the first and second cams 220*a*, 220*b*. The cams 220 may be arranged at or near the end of the shafts 222*a*, 222*b* so as to be arranged under the corners of the basket 150.

The cams 220 may have a lobe or lever portion 225 (also referred to as a lever 225) on one side of the shaft 222 and a heal on the other side of the shaft 222. The cams 220 are fixed to the shaft 222 such that the cams 220 rotate as the shaft 222 rotates.

The cams 220 are alternatingly arranged so that the lever portion 225 of one cam 220 does not align with the lever portion 225 of another one of the cams. In the example shown in FIG. 2, the cams 220 are alternatingly arranged such that the lever portion 225 of one cam 220 is opposite that of the cam 220 on the same shaft. For example, the lever 225 of the first cam 220*a* arranged on the first shaft 222*a* is arranged above the shaft while the lever 225 of the third cam 220*c* arranged on the first shaft 222*a* is arranged below the shaft. Similarly, the lever 225 of the second cam 2220*b* arranged on the second shaft 222*b* is to one side of the shaft, while the lever 225 of the fourth cam 220*d* arranged on the second shaft 222*b* is to the other side of the shaft. In the example of the four cams 220 shown in FIG. 2, each lever 225 is offset by 90 degrees from the lever of the adjacent cam 220 on the same second side 208.

While the levers 225 of the cams 220 on the same shaft 222 are shown to be offset by 180 degrees and the levers 225 of the cams 220 on the same second side 208 are shown to be offset by 90 degrees, these offsets are merely examples and varying degrees of offset may be appreciated. In another example, two of the four cams 220 may have levers 225 in the same position relative to the shafts 222. For example, the first and second cams 220*a,b* may have levers 225 at the same position and the third and fourth cams 220*c,d* may have levers 225 at a different, and possibly opposite, position that those of the cams on the first of the second sides 208. In another example, the first and third cams 220*a,c* on the first shaft 222*a* may have levers 225 at the same position and the second and fourth cams 220*b,d* on the second shaft 222*b* may have levers at a different, and possibly opposite, position as those of the cams on the first shaft 222*a*.

Upon rotation of the shaft 222, the cams 220 may also rotate. The base 214 is configured to move and be elevated upon the lever 225 of a respective cam 220 moving. Thus, various corners of the basket 150 may rise and fall with respect to one another as the shafts 222 rotate. This is described in more detail with respect to FIGS. 3 and 4.

The camshaft assembly 204 may be controlled by a gearing system 230. The gearing system 230 may be fixed to the first rack 122, or the gearing mechanism may be attached the back wall of the dishwasher cavity. In this latter example, when the rack 122 is pulled from the cabinet for loading or unloaded of items, the shaft 222*s* may disengage from the gearing system 230. The shaft 222*s* may reengage with the gearing system 230 when the rack 122 is returned to the cabinet.

The gearing system 230 may include a gearing mechanism such as a Michigan manifold. The gearing mechanism may include a Pelton wheel configured to generate a rotary motion. The wheel may be driven by a jet stream provided by a feed tube. Thus, water from the dishwasher 100 may be used to drive the gearing system 230 and thus rotate the camshaft assembly 204. The use of a motor may be avoided, keeping costs and maintenance low. However, motors may be used in the alternative or in addition to the wheel.

The camshaft assembly 204 may include a controller 228 to control the components herein such as motors, gears, sensors, etc. For example, the controller 228 may control the gearing system 230 and thus control the shaft 222*s* and cams 220. The controller may include the machine controller and any additional controllers provided for controlling any of the components of the dishwasher 100. Many known types of controllers can be used for the controller 228. It is contemplated that the controller is a microprocessor-based controller that implements control software and sends/receives one or more electrical signals to/from each of the various working components to implement the control software.

The controller may also include or be coupled to a memory configured to include instructions and databases to carry out the systems and processes disclosed herein. The controller 228 may also be part of the general dishwasher control system that controls wash cycles and other systems. The controller 228 may be programmed to rotate the shafts 222 during high spray volume times of the cycle. The controller 228 may also be programmed to rotate the shafts 222 at specific speeds for the most optimum wash capabilities.

The controller 228 may receive data and commands from the system components and may also have an antenna for wireless communication with the devices within the dishwasher 100, as well as device remote from the dishwasher 100. In one example, the controller 228 may receive commands from a user interface on the dishwasher 100. Additionally or alternatively, the controller 228 may receive commands from a mobile application on device remote from the dishwasher 100.

A ball joint 236 may be arranged under the base 214 of the basket 150. The ball joint 236 may be a spherical or semi-spherical joint configured to provide support to the basket 150. The ball joint 236 may be configured to rest on the rack 122 when the basket 150 is in an installed position. Additionally or alternatively, the ball joint 236 may be installed on the rack 122 and the basket 150 is configured to rest on top of the joint 236 when installed. The joint 236 may be configured to provide a pivot point for the basket 150 as the basket elevation changes with the rotation of the shafts 222 and relative positions of the cams 220. The joint 236 may be positioned at the center of the base 214, but other positions may be appreciated.

Figure 3:
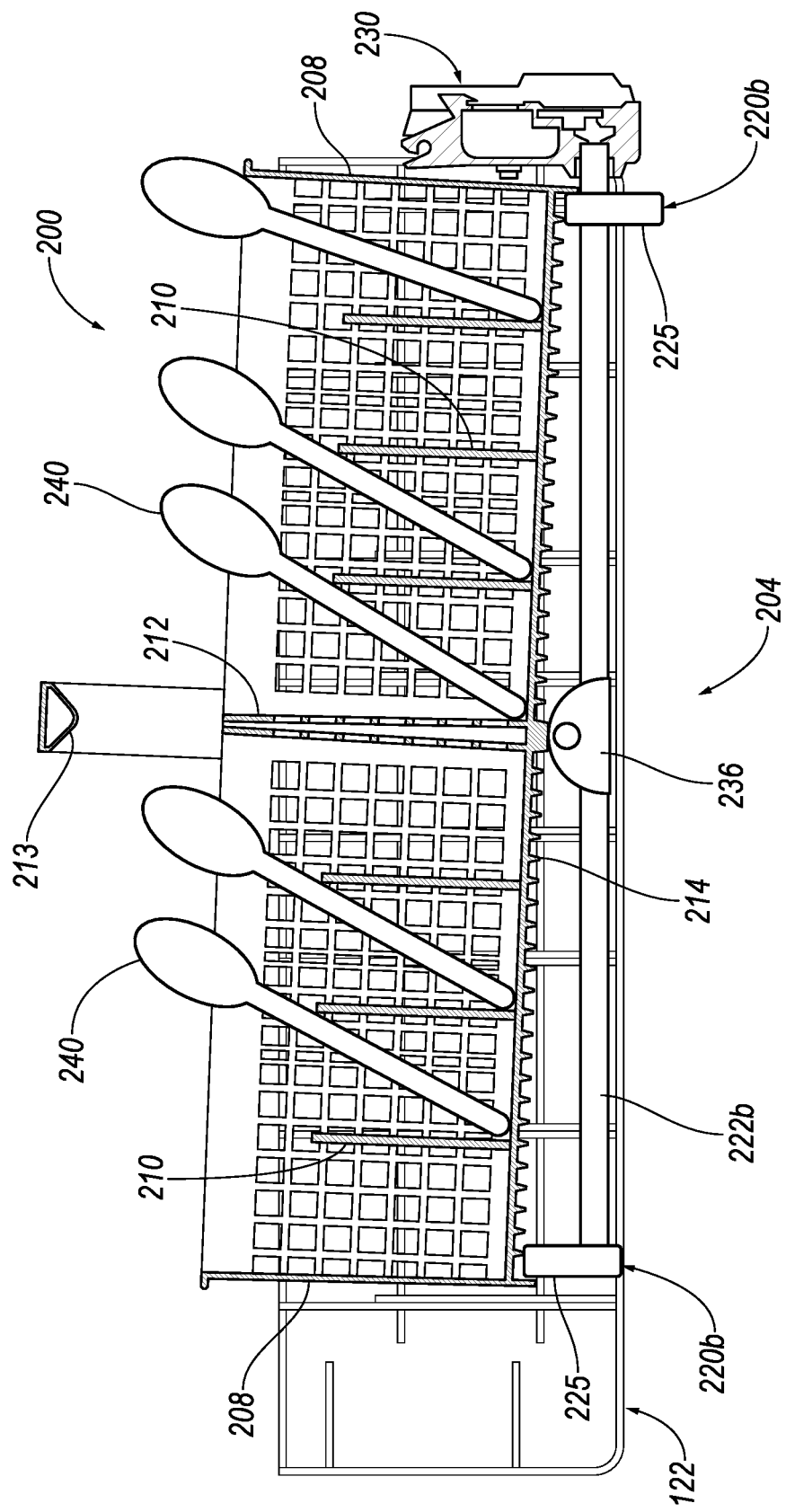
FIG. 3 illustrates a side elevational view of the example silverware basket assembly and camshaft assembly in a first position.
Figure 4:
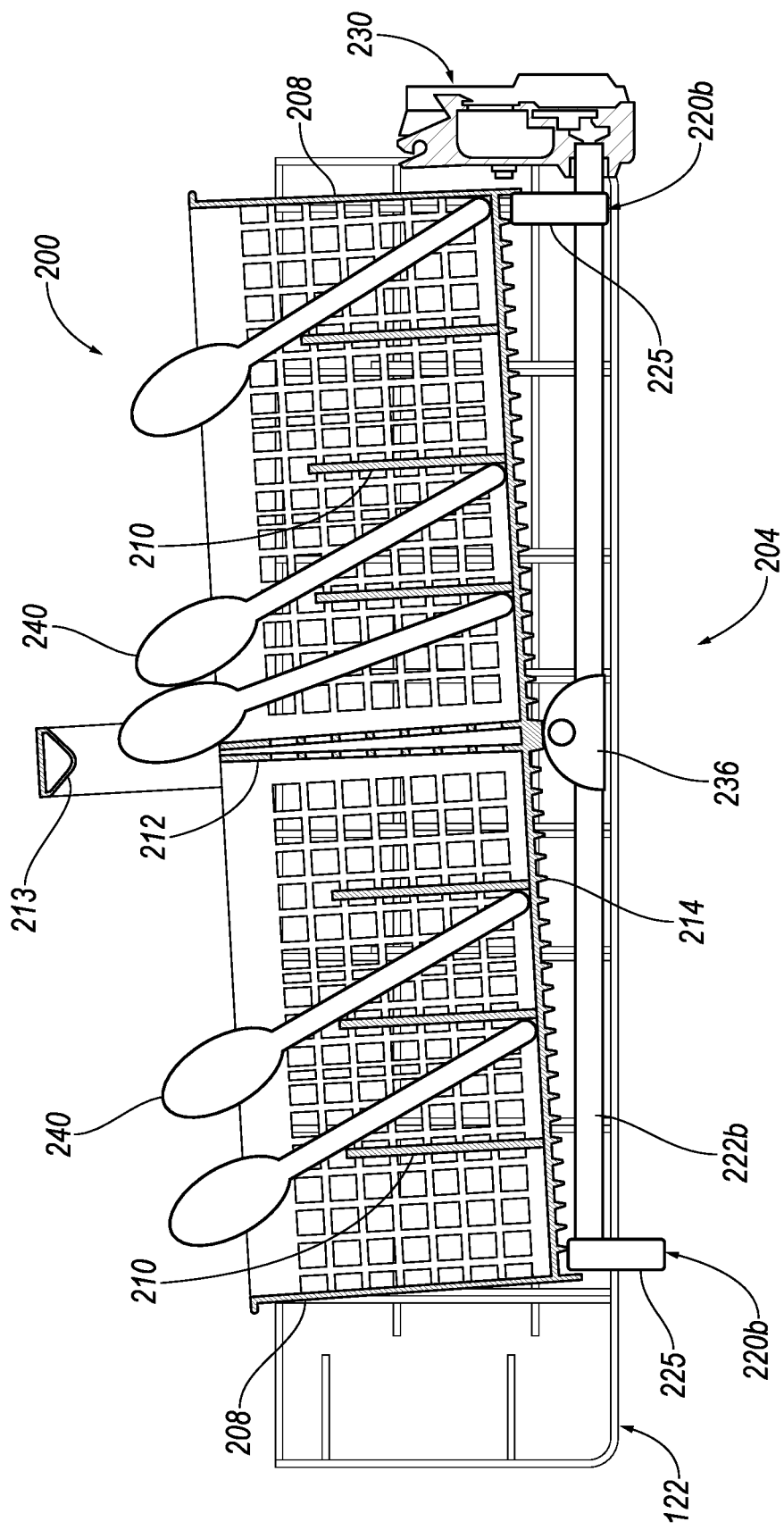
FIG. 4 illustrates a side elevational view of an example silverware basket and camshaft assembly in a second position.

FIG. 3 illustrates a side elevational view of the example utensil basket 150 and camshaft assembly 204 in a first position. FIG. 4 illustrates a side elevational view of an example utensil basket 150 and camshaft assembly 204 in a second position. In these figures, it may be assumed that the second shaft 222b and the second and fourth cams 220b, d are visible. However, these features described with respect to these example figures may also relate to the first shaft 222a and the first and third cams 220a, c.

In the first position shown in FIG. 3, the lever 225 of the second cam 220b may be arranged above the second shaft 222b while the lever 225 of the fourth cam 220d may be arranged below the second shaft 222b. This may elevate one of the second sides 208 of basket 150, the side opposite the gearing system 230. Silverware 240 (or utensils 240) arranged within the basket 150 may then tilt towards the opposite side of the basket 150 as the other side is lifted via the cams 220.

In the second position shown in FIG. 4, the lever 225 of the fourth cam 220d may be arranged above the second shaft 222b while the lever 225 of the second cam 220b may be arranged below the second shaft 222b. This may elevate the other one of the second sides 208 of basket 150, the side adjacent to the gearing system 230. Silverware 240 arranged within the basket 150 may then tilt towards the opposite side of the basket 150 as the other side is lifted via the cams 220. The gearing system 230 may rotate the shafts 222 so that the position of the lever 225 of the cams 220 rotates, intermittently altering the angle of the basket 150 and causing the silverware 240 to change position within the basket 150 as well as alter their relative height within the dishwasher 100.

Figure 6:
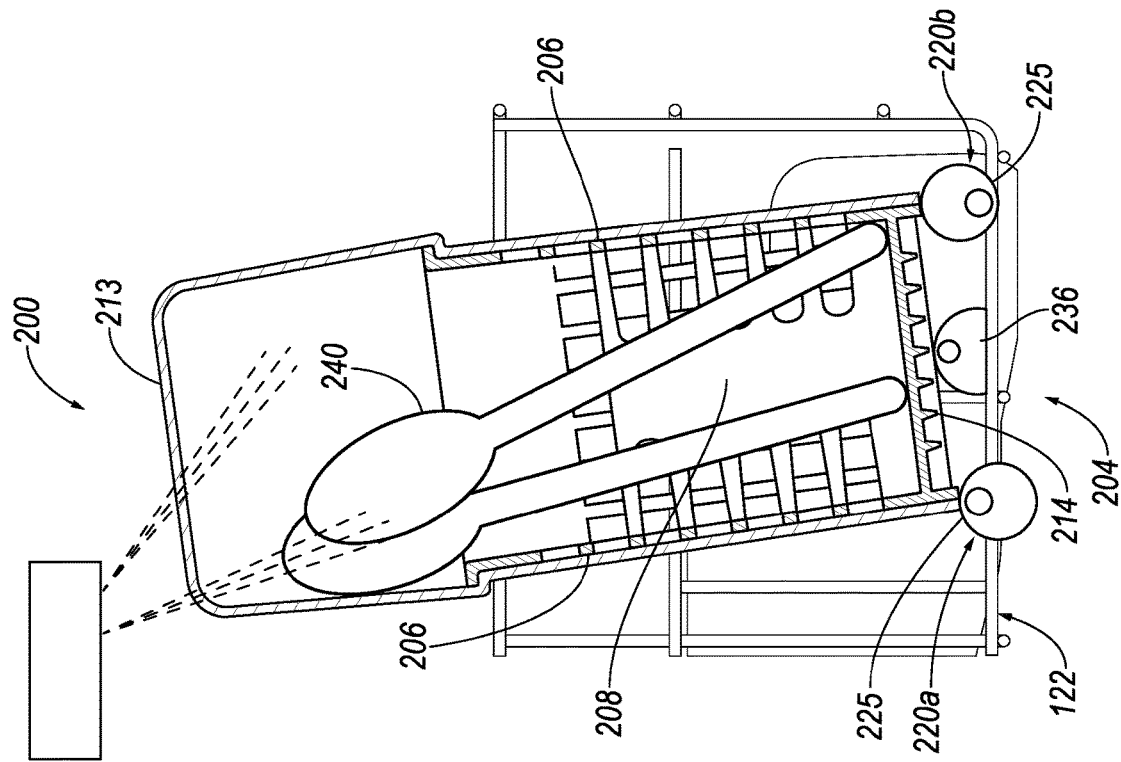
FIG. 6 illustrates a front elevational view of an example silverware basket and camshaft assembly in a fourth position.
Figure 5:
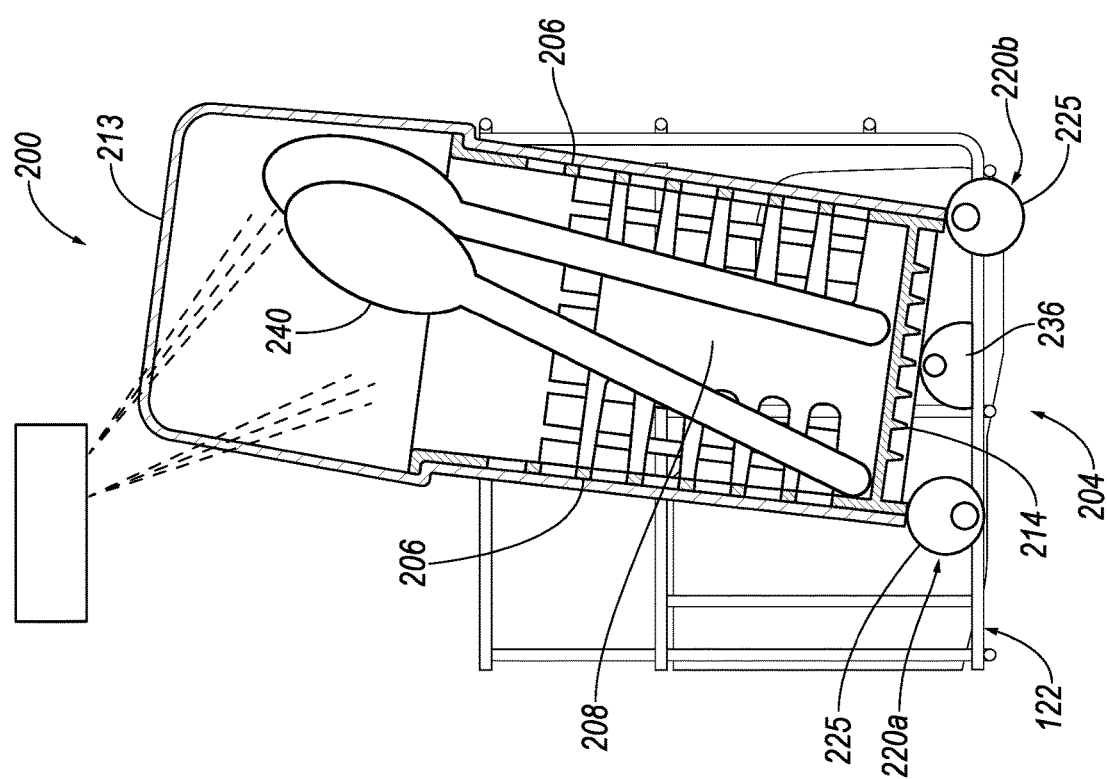
FIG. 5 illustrates a front elevational view of an example silverware basket and camshaft assembly in a third position.

FIG. 5 illustrates a front elevational view of the example silverware basket 150 and camshaft assembly 204 in a third position. FIG. 6 illustrates a front elevational view of the example silverware basket 150 and camshaft assembly 204 in a fourth position. In these figures, it may be assumed that the first cam 220a on the first shaft 222a and the second cam 220b on the second shaft 222b are visible at the first of the second sides 208. However, these features described with respect to these example figures may also relate to the third cam 220c and fourth cam 220d at the second of the second sides 208 adjacent the gearing system 230.

In the third position, shown in FIG. 5, the lever 225 of the first cam 220a may be arranged above the first shaft 222a while the lever 225 of the second cam 220b may be arranged below the second shaft 222b. This may elevate one of the first sides 206 of basket 150. Silverware 240 arranged within the basket 150 may then tilt towards the opposite side of the basket 150 as the other side is lifted via the cams 220.

In the fourth position, shown in FIG. 6, the lever 225 of the second cam 220b may be arranged above the second shaft 222b while the lever 225 of the first cam 220a may be arranged below the first shaft 222a. This may elevate the other one of the first sides 206 of basket 150. Silverware 240 arranged within the basket 150 may then tilt towards the opposite side of the basket 150 as the other side is lifted via the cams 220. The gearing system 230 may rotate the shafts 222 so that the position of the lever 225 of the cams 220 rotates, intermittently altering the angle of the basket 150 and causing the silverware 240 to change position within the basket 150 as well as alter their relative height within the dishwasher 100.

It should be understood that the first and second shafts 222 may be rotated concurrently. Alternatively, the shafts may be rotated one at a time. The shafts may be rotated as part of a pattern controlled by the controller 238. The pattern may dictate which of the four corners of the basket 150 is elevated with respect to the others, or which side of the basket 150 is elevated with respect to the other side. Additionally, various settings on how the basket 150 is to be moved may be available and customizable. Regardless, the cams 220 may allow the basket 150 to intermittently or continually move about the ball joint 236, allowing the silverware to intermittently or continually move within the basket 150.

In one example, as shown in FIG. 2, the levers 225 of each of the cams 220 may be at different positions. Upon rotation of the shafts 222, this may allow one of the corners of the basket 150 to be elevated, followed by another one of the corners, and so on. With the levers 225 of the cams 220 being at different radial locations about the shafts 222, the rotation of the shafts 222 allows for a gradual and smooth transition of the elevated corners. This may allow for movement of the silverware 240 within the basket 150, but also mitigate any wear and tear, noise, etc., on the silverware 240, basket 150 or rack 122.

By altering the height of the corners of the basket 150, the height and position of the utensils 240 also changes. As illustrated best in FIGS. 5 and 6, the spray pattern relative to the basket 150 may remain consistent. However, the utensils 240 may move in order to present a different portion of the utensils 240 into the spray. Further, by alternating the corner that is elevated also allows the utensils 240 in one part of the basket to be lower than those at other parts of the basket. Accordingly, these higher utensils 240 may be more accessible to the spray from the sides, in addition to the tops which are more accessible due to the height increase. There is less blockage of the utensils due to adjacent utensils in the neighboring cavities being lower than the elevated ones.

With minimal parts, camshaft assembly 204 of the basket 150 may allow for increased cleaning capabilities of utensils stored within the basket 150. The basket 150 may be loaded and unload and be removable from the rack in a traditional sense, increasing user satisfaction. Furthermore, various portions of the utensils may be accessible to the spray without the need for individual silverware separators that are timely to load and unload and limit the space for silverware in a basket.

While exemplary embodiments are described above, it is not intended that these embodiments describe all possible forms of the invention. Rather, the words used in the specification are words of description rather than limitation, and it is understood that various changes may be made without departing from the spirit and scope of the invention.

Additionally, the features of various implementing embodiments may be combined to form further embodiments of the invention.

For purposes of description herein the terms "upper," "lower," "right," "left," "rear," "front," "vertical," "horizontal," and derivatives thereof shall relate to the device as oriented in FIG. 1. However, it is to be understood that the device may assume various alternative orientations and step sequences, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

The flowcharts and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A dishwasher system for cleaning dishes, comprising:
   at least one rack configured to receive a silverware basket, the basket including at least one silverware compartment;
   a pair of camshafts including a first camshaft and a second camshaft, each fixed to the rack and operable by a gearbox configured to rotate the camshafts with respect to the rack, the camshafts arranged below the silverware basket; and
   a cam arranged at each end of each of the camshafts, wherein upon rotation of the camshafts by the gearbox, the cams affect the height of a respective corner of the basket to allow silverware therein to be lifted or lowered and exposed to spray at various heights and/or angles from sprayers within the dishwasher system.

2. The dishwasher system of claim 1, wherein the camshafts are parallel to one another.

3. The dishwasher system of claim 1, further comprising a pivot point arranged at a center of the basket along the rack to support the basket during rotation of the cams.

4. The dishwasher system of claim 1, wherein each of the cams includes a lever portion configured to lift a respective corner of the basket when the respective cam is rotated to the top of the respective camshaft.

5. The dishwasher system of claim 4, wherein the levers of each of the cams is at a radial position relative to the camshaft that differs from the radial positions of the levers of the other cams.

6. The dishwasher system of claim 4, where the lever portion of one of the cams is unaligned with at least one of the lever portion of the other cams.

7. A dishwasher system for cleaning dishes, comprising:
   at least one rack configured to receive a silverware basket for receiving utensils for washing,
   a camshaft assembly fixed to the rack and operable by a gearbox, the camshaft assembly including at least one camshaft configured to rotate with respect to the rack via the gearbox, the camshaft arranged below the silverware basket, and
   at least one cam arranged on the camshaft, wherein upon rotation of the camshaft by the gearbox, the cam affects the height of the silverware basket to allow the utensils therein to be intermittently lifted and exposed to spray from sprayers within the dishwasher system.

8. The dishwasher system of claim 7, wherein the at least one camshaft includes a pair of camshafts arranged parallel to each other and along a base of the basket.

9. The dishwasher system of claim 8, wherein the at least one cam includes a pair of cams arranged at each end of each of the camshafts to intermittently lift one of the corners of the basket.

10. The dishwasher system of claim 9, wherein each of the cams includes a lever portion configured to lift a respective corner of the basket when the respective cam is rotated to the top of the camshaft.

11. The dishwasher system of claim 10, wherein the levers of each of the cams are at a radial position relative to the camshaft that differs from the radial positions of the levers of the other cams.

12. The dishwasher system of claim 10, wherein the lever portion of one of the cams is unaligned with the lever portion of any adjacent ones of the cams.

13. The dishwasher system of claim 9, further comprising a ball joint arranged between the camshafts to support the basket during rotation of the camshaft.

14. A dishwasher system for cleaning dishes, comprising:
   at least one rack configured to receive a silverware basket for receiving utensils for washing,
   a camshaft assembly fixed to the rack and operable by a gearbox, the camshaft assembly including at least one camshaft configured to rotate with respect to the rack via the gearbox, the camshaft arranged below the silverware basket, and
   at least one cam arranged on the camshaft, wherein upon rotation of the camshaft by the gearbox, the cam affects the height of the silverware basket to allow the utensils therein to be intermittently lifted and exposed to spray from sprayers within the dishwasher system, wherein the at least one cam includes a lever portion configured to lift a respective corner of the basket when the respective cam is rotate to the top of the camshaft.

15. The dishwasher system of claim 14, wherein the at least one camshaft includes a pair of camshafts arranged parallel to each other and along a base of the basket.

16. The dishwasher system of claim 15, wherein the at least one cam includes a pair of cams arranged at each end of each of the camshafts to intermittently lift one of the corners of the basket.

17. The dishwasher system of claim 16, wherein the levers of each of the cams are at a radial position relative to the camshaft that differs from the radial positions of the levers of the other cams.

18. The dishwasher system of claim 16, wherein the lever portion of one of the cams is unaligned with the lever portion of any adjacent ones of the cams.

19. The dishwasher system of claim 16, further comprising a ball joint arranged between the camshafts to support the basket during rotation of the camshaft.

* * * * *